Patented Aug. 29, 1933

1,924,169

UNITED STATES PATENT OFFICE 1,924,169

ANTISEPTIC PREPARATION

John E. Stacey, Saugus, Mass., assignor to Otis Clapp & Son, Inc., Boston, Mass., a Corporation of Massachusetts No Drawing. Application March 10, 1931
Serial No. 521,507

3 Claims. (Cl. 167—58)

This invention relates to an antiseptic healing preparation, possessing local anaesthetic properties and especially suitable for use in the treatment of wounds, burns and similar surface lesions of the human body. Among the objects of my invention are to provide a preparation of this kind having the characteristics of rapidity of penetration, of increased germicidal activity and of decreased toxicity.

My invention utilizes in such a preparation, one or more of the cresols in combination with artificial or natural camphor or homologues thereof. The cresol of the preparation exhibits strong antiseptic properties, causes a marked local anaesthetic effect, and serves to diminish bleeding in the case of wounds. The camphor of the preparation performs, in relation to the cresol, the function of neutralizing the usual caustic action of cresol on human tissue. In addition, the camphor stimulates the tissue at the seat of the injury. This effect is valuable in counteracting the tendency of the anaesthetic action of cresol to cause diminution of blood supply at the affected part.

The camphor and cresol of my improved antiseptic preparation should be present in a homogeneous mixture, in general in the ratio of approximately three parts of camphor to one part of cresol, by weight. I am unable completely to explain the chemical relations which exist between these ingredients of the preparation, but I believe that the cresols and camphor in part react to form one or more molecular addition compounds, very materially depressing the percentage of free cresol present at any given time in the mixture. Observations of the heat of reaction in mixing series of liquid solutions of the cresols and of camphor indicate that at room temperature the reaction between these ingredients is predominantly in the molecular ratio of 2 to 1. This is borne out by studies of other physical properties of the camphor-cresol complex. Apparently the combination of cresol and camphor exists in such equilibrium relationship that there is always available an effective percentage content of cresol and that, as this is used up, the camphor-cresol complex is subject to progressive dissociation. I question, however, whether this observed action of the mixture can be wholly explained on strictly chemical grounds as biochemical reactions involving the reaction of cresol on living tissue, concerning which very little is known, probably should also be considered.

While all of the cresols are suitable for use in my antiseptic preparation, another aspect of my invention consists in the discovery that camphor in combination with meta-cresol forms a more effective bactericide and antiseptic than similar combinations with the other cresols. In addition, in preparing the antiseptic product with camphor, I have found that the combination between meta-cresol and camphor may be completed in about three or four hours while the other cresols require much longer periods of time. The rather disagreeable odors which accompany ortho-cresol and para-cresol are not present in meta-cresol. Hence the preferred form of my product, containing meta-cresol, is more agreeable to the sense of smell than products containing the other cresols.

The preparation, containing cresol and camphor in the approximate proportion of one to three, preferably includes, in addition, suitable non-irritating, compatible organic solvent material which prevents the uncombined portion of camphor from crystallizing, particularly at low temperatures, and maintains the principal therapeutic ingredients of the preparation in a homogeneous state in the preferred proportions in which they are incorporated. It is desirable also that this solvent material be capable of retarding evaporation of the camphor. This preferred effect of the solvent aids in making a greater proportion of the camphor available at the place of application of the preparation. For this reason, the solvent material preferably is an oily, somewhat viscous, substance of which the rate of evaporation at room temperature or body heat is about the same, or less than (but not substantially greater than) that of camphor. Various solvent materials meet these several requirements, and are suitable for use in some cases. Among these are: benzyl alcohol, benzyl benzoate, benzyl acetate, phenylethyl alcohol, and light mineral oil. My preference is for a solvent consisting of a non-irritating, non-toxic essential oil of the terpene group, by which group I mean to include the terpene hydrocarbons and their derivatives. Instances of preferred oils of this class are the essential oils of pine (Templin oil), pine #5, Pinus palustris and fraction thereof, Pinus pumilio, Pinus sylvestris, and of pine needles. These and other similar essential oils are to be preferred as ingredients for performing the described solvent and evaporation-retarding action since they are of themselves suitable useful germicidal agents.

Another group of substances suitable to perform the solvent and evaporation-retarding functions are the balsams of the oleo-resinous type, such for example as balsam of Peru, balsam of Styrax, balsam of copaiba, Mecca balsam, and Balsam of fir Canadian and Oregon, those balsams, such as balsam of Peru and balsam of Styrax, which contain benzoic and cinnamic acid are preferred because of their additional effects of promoting healing, stimulating affected tissue and correcting itching. In the use of balsam alone as a solvent material, some heat is necessary to effect the desired homogeneous mixture in initially compounding the preparation.

The quantity of solvent material incorporated in the product will of course vary with the particular solvent employed, the excess of camphor present in the preparation, and the range of temperature to which the preparation may be subjected, (preferably a sufficient quantity being incorporated to prevent crystallization of the camphor at zero degree centigrade, or if desired at still lower temperatures). The presence in the preparation of ingredients other than the cresol and camphor may also in some degree influence the quantity of solvent which should be employed to render the camphor non-crystallizable at low temperatures. In the event that the preparation is to consist solely of, for example, meta-cresol approximately 21 parts, camphor, approximately 63 parts, and oil of pine needles, this latter ingredient may be present to the extent of approximately 16 parts, although such amount of oil is probably in excess of the minimum required to maintain a homogeneous mixture at any temperature likely to be encountered.

Obviously several solvent materials may be used in place of one; thus, part or all of the above-described essential oil may well be replaced by balsam.

The bactericidal action of the above combination, comprising chiefly meta-cresol and camphor, has been tested and found effective within required limits against such bacteria as Bacillus typhosus (Hopkins), Bacillus coli, Streptococcus hemolyticus, Staphylococcus aureus, Bacillus anthracis, and Staphylococcus albus.

My improved antiseptic healing preparation is characterized by the desirable combination of a high germicidal power and a low toxicity. The product is but sparingly soluble in watery fluids such as blood, and has a very low surface tension. This combination of characteristics is deemed of value. The fact that the product is only sparingly soluble in water is believed to diminish the rate of absorption of the product into the system and to diminish coagulation of the blood. The low surface tension is believed to facilitate the rapid penetration of the product into all of the minute parts of a wound or burn.

The product is capable of stimulating granulation of the affected parts and hence promotes healing.

The antiseptic product described above is intended to be applied full strength in a liquid form. Its therapeutic properties are available, however, when it is in a diluted state. For example, the full-strength product is capable of being made into ointments in the forms of creams and salves by the addition of a suitable ointment base which may contain such tissue feeding substances as lanoline as well as ingredients which impart to the ointment a creamy consistency. In this form, the product is of diminished strength and constitutes a bland protective agent for promoting healing of wounds and burns. This form of the product is preferably applied after a preliminary or first aid treatment with the full strength product in a liquid form. A preferable proportion for the cream or salve consists of one part of the full-strength product to nine parts of ointment base, although this ratio is capable of wide variation.

Many compatible diluents for the liquid form of the product are available, among these being mineral oil (liquid petrolatum), or certain vegetable oils such as olive and linseed oils, or mixtures of these, such diluents assisting also in preventing adhesion of a dressing to the affected tissue.

The improved preparation may likewise be diluted in firm unctuous form, for permanent dressings, by the use therewith of beeswax, cerasin, ozokerite, soft or hard petroleum, animal fats such as wool fat, or metallic oleates such as sodium oleate.

As explained above, the preferred ratio of cresol to camphor in the preparation is one part of cresol to three parts of camphor by weight. Increases in the cresol content tend to impart to the mixture an increasingly caustic effect. When the preparation is to be used full strength in the liquid form containing for example, meta-cresol, camphor and oil of pine needles and balsam Peru, it is recommended that the cresol content be not allowed to exceed a ratio represented by 1 part by weight of cresol to 2.6 parts by weight of camphor. Obviously higher proportions of cresol might be employed for definite uses of the product if the caustic effect is kept sufficiently low, as by dilution to a sufficient extent, or if the product is to be used in such a way that some caustic action is not harmful. However it has thus far been found unnecessary to use a greater proportion of cresol than is represented by 1 part by weight of cresol to 3 parts by weight of camphor, at which proportion the product is almost free of caustic action, while yet having a high germicidal effect.

It is to be understood that when I refer to the relative proportions of cresol and camphor in the preparation, I intend to include only cresol which would be in its active caustic state were it not for the modifying action of the camphor thereon. Obviously my invention does not exclude the possibility of the employment of my improved product with an excess of cresol therein, such excess being suitably rendered non-caustic by some ingredient other than camphor.

The camphor content of the product may obviously be increased with respect to the cresol content, although such increase is deemed to be unnecessary and to diminish the efficiency of the germicidal product. For example I have experimentally made a preparation in which the proportions of cresol and camphor were 1 to 4, the product containing 16.73 parts by weight of cresol and 66.95 parts by weight of camphor, and 41.32 parts by weight of oil of pine needles, this latter ingredient maintaining the mixture in the form of a homogeneous liquid even at low temperature. For ordinary use, however, the camphor should probably not be present to a greater extent than is represented by 3.5 parts of camphor to 1 part of cresol. I prefer to use 3 parts of camphor and 1 part of cresol.

It should be understood that the present disclosure is for the purpose of illustration only and that this invention includes all modifications and equivalents which fall within the scope of the appended claims.

I claim:

1. An antiseptic preparation including as ingredients a cresol selected from a group consisting of ortho-cresol, para-cresol, and meta-cresol and camphor in approximately the ratio of 1 to 3 by weight and an essential oil.

2. An antiseptic preparation including as ingredients meta-cresol and camphor in approximately the ratio of 1 to 3 by weight and an essential oil.

3. An antiseptic preparation including as ingredients a cresol selected from a group consisting of ortho-cresol, para-cresol and meta-cresol and camphor in approximately the ratio of 1 to 3 by weight and an ingredient selected from a group consisting of essential oils of the terpene series and balsam of the oleo-resinous type.

JOHN E. STACEY.